Patented Sept. 4, 1951

2,566,602

UNITED STATES PATENT OFFICE 2,566,602

EXPLOSIVE COMPOSITION

Martin de Simo, Morton Grove, Ill., assignor to Great Lakes Carbon Corporation, Morton Grove, Ill., a corporation of Delaware No Drawing. Application September 3, 1947, Serial No. 772,015

1 Claim. (Cl. 52—17)

This invention relates to a new composition useful as gunpowder, blasting powder, fuse powder, and for other purposes in which explosives are required.

Gunpowder or blasting powder of the so-called black powder type is commonly prepared from a mixture of potassium nitrate, elemental sulfur and wood charcoal. The various compositions included within the term of black powder have undergone but relatively minor improvements through the course of many centuries. Briefly, such powders are made by grinding a carefully carbonized and selected wood charcoal, a pure grade of elemental sulfur, also ground to a fine powder, and powdered potassium nitrate or saltpeter. Other nitrates such as those of sodium, barium and ammonia have been suggested and used. The individual ingredients are generally ground, then mixed together, and finally subjected to treatment in an incorporating mill where it is ground and mixed intimately by means of heavy iron edge runners. Moisture is added so that the powder will not be so dry as to form a dust but yet not be sufficiently wet to stick to the runners or slide out from under them.

In one specific embodiment the present invention comprises an explosive composition of the black powder type comprising an oxidizing agent such as potassium nitrate and a reactive carbonaceous material comprising sulfohydrocarbons and/or sulfocarbons, to which mixture elemental sulfur may or may not be added in varying proportions.

The sulfohydrocarbons which form a component of the novel composition are highly amorphous, substantially homogeneous, infusible, black solids varying in density from about 1.3 to about 1.7 and comprising sulfur, carbon, and hydrogen in chemical combination. They are insoluble in any known solvent.

The carbon content of the sulfohydrocarbons ranges from about 47 to 70%; the hydrogen from about 1.8 to about 4%; the sulfur from about 25 to about 50%. Certain of these compositions may contain minor amounts of ash.

The sulfohydrocarbons are produced by intimately mixing and heating sulfur with suitable heavy hydrocarbonaceous materials such as pitch, asphalt, petroleum residuums, etc., at from about 300–450° F., and thereafter heating the mixture from about 450 to 625° F. to produce a solid reaction product referred as a sulfohydrocarbon and containing sulfur and hydrogen in chemical combination with carbon. The amount of sulfur employed is equivalent to at least 60% of the hydrogen in the hydrocarbonaceous material.

The sulfocarbons are likewise amorphous, hard, black, infusible solids varying in density from about 1.5 to about 1.9, comprising sulfur in stable chemical combination with carbon and containing relatively smaller amounts of hydrogen than the sulfohydrocarbons. They are produced by calcining the sulfohydrocarbons in an oxygen-free atmosphere at about 1100° F. to about 1800° F. For purposes of this invention they are preferably heated at a temperature of about 1100° F. to about 1300° F.

Calcining temperatures between about 450–1300° F. or higher can be used to produce the insoluble, infusible compounds of sulfur, hydrogen and carbon used in this invention and to change the proportion of sulfur to carbon.

The sulfohydrocarbons and the sulfocarbons thus produced are highly reactive substances in that they undergo various types of reaction involving the combination of carbon with other compounds or elements, at substantially lower temperatures and under milder conditions than is generally considered possible with carbon in other forms and combinations. This reactivity is not necessarily related to the physical structure generally associated with the so-called activated carbons in which the properties of the carbon and its ability to perform certain functions such as decolorization, gas absorption, catalytic activity, etc., are generally regarded as a property associated with its physical form.

Considered from the standpoint of the quantity of sulfur and hydrogen in combination with the carbon in the sulfohydrocarbons and sulfocarbons, I have found that it becomes possible when employing these compounds in the manufacture of explosive powders to produce materials having a wide variety of properties. Normally, black powders which are used largely for mining and blasting purposes may contain from about 60 to about 75% of potassium nitrate, 2 to 20% of sulfur, from about 10 to 25% of charcoal. In general, the compositions employing the present materials are in the same range of proportions. The properties of the resulting compounds, however, are substantially different and can be varied readily over a wide range to meet the desired requirements.

The mixture may comprise a powerful oxidizing agent such as a nitrate including potassium nitrate, sodium nitrate, ammonium nitrate, barium nitrate, and the like. They may include the corresponding chlorates. Perchlorates may also be used, it being a particular requirement that the material be an active, vigorous, oxidizing compound. It is within the scope of the invention to employ a sulfohydrocarbon or mixture of sulfohydrocarbons having the sulfur and carbon in combination in the right proportions to supply all of these elements that may be needed in the finished powder.

Thus, for example, a blasting powder, may be made comprising 75 parts of potassium nitrate and 25 parts by weight of a sulfohydrocarbon. This sulfohydrocarbon may contain 60% carbon, 2.2% hydrogen, and 37.8% sulfur. This means that the powder, calculated on the moisture-free basis, would contain 75% potassium nitrate, 9.5% sulfur, 15% carbon, and .55% hydrogen.

It is also within the scope of the invention that sulfocarbons be mixed with the oxidizing agent such as potassium nitrate or other nitrate. Such a sulfocarbon may comprise 78% carbon, 1.5% hydrogen and 20.5% sulfur. When using this sulfocarbon in proportions of 25 parts sulfocarbon to 75 parts potassium nitrate, the resulting mixture would contain 14.5 parts of carbon and 5.1 parts of sulfur and .375% hydrogen. In this case the proportion of sulfur in the powder may be lower than is desired. Hence, in order to modify the burning characteristics of the powder and the volume of the combustion gases, it may be desirable to increase the sulfur content to the order of 8 to 20% by adding elemental sulfur to the mixture. According to another variation a part of the sulfur can be supplied by adding sulfohydrocarbons either alone or together with additional elemental sulfur to raise the sulfur content substantially.

It is an advantage of this invention that the sulfocarbonaceous compound can be prepared having the desired proportion of sulfur by calcining the sulfohydrocarbons at different temperature levels. This has the effect of removing hydrogen from the material as hydrogen sulfide. When this is done, not only the reactivity of the calcined material is altered, but the amount of sulfur in combination is changed.

In general, between the two extremes in which the carbon and sulfur is supplied wholly on the one hand by the sulfohydrocarbon and on the other hand by the sulfocarbon, additional sulfur can be supplied as elemental sulfur or a mixture of elemental sulfur and sulfohydrocarbon can be employed.

The sulfo-compositions comprise essentially about 47-93% carbon, 0.3-4% hydrogen and 6-50% sulfur in stable chemical combination.

In this way, blasting powders or propellants of varying properties are produced. These properties are mainly reflected in the burning rate of the final mixture and the temperature and gas volume of the products of explosion. These are important factors in the final powder. The sulfohydrocarbons may produce relatively slow burning powders and in certain instances it may be desirable to add some elemental sulfur in addition to that in combination to aid in the initiation of burning. According to past practice one method of varying the properties has been to change the density or the particle size or both, of the powder. With the material of this invention these characteristics can be changed without necessarily changing particle size or its density.

The formation of hydrogen sulfide followed by its oxidation at the time ignition is initiated tends to catalyze the reaction so that as the combustion proceeds there is increased rate of burning which results in a relatively slow starting powder which burns more rapidly as the reaction proceeds.

The mixtures containing sulfocarbons alone are also relatively slow starting and appear to be somewhat more difficult to start burning. Because of the relatively low amount of hydrogen present and because of the relatively low amount of sulfur in the sulfohydrocarbons the slower reaction which takes place betwen the oxidizing agent, e. g., potassium nitrate, and the carbon itself would seem to be favored. Thus, at the two extremes when using certain sulfohydrocarbons and certain sulfocarbons it would appear that powders having relatively slow burning qualities are produced. Intermediate of these mixtures when elemental sulfur may be added to make up the deficiency in sulfur, the powders can be made more rapid burning. Thus it becomes apparent that, unlike conventional mixtures of charcoal, sulfur, and nitrate, a means for controlling the explosive characteristics is provided by this invention. According to a modification of the invention, mixtures of nitrates may be used, e. g., potassium nitrate with a minor percentage of ammonium nitrate. This has the advantage of aiding in the ignition of the mixture and seems to make combustion more complete.

The quality of black powder is said to be dependent upon the charcoal employed and the method of its manufacture. In order to produce satisfactory powders, the carbonization must be carefully controlled. This may in part be due to the amount of hydrogen remaining in the charcoal, but, in any event, the principal reaction is one between sulfur and the porous carbon of the charcoal.

In the case of the present invention, however, the carbon is in highly reactive form in all of the mixtures coming within the scope of the invention. The burning characteristics can be modified by the amount of sulfur that is in combination and this in turn can be modified by the mode of preparation of the sulfur compound, particularly by the temperature and time of calcination, or adding elemental sulfur to the mixture. Thus, a far greater flexibility is obtained.

It is an advantage of the present invention that the sulfocarbons and sulfohydrocarbons can be reproduced with remarkable accuracy insofar as their composition and reactive qualities are concerned and hence, are not subject to the great variations that have always been a drawback in the manufacture of charcoal for use in powder.

Another advantage of the present invention lies in the fact that the mixing and grinding procedures are greatly simplified. According to the old practice sulfur was ground with an edge runner to very fine particle size. Because of the particles of sulfur rubbing over one another, static electrical charges were produced which were not only a source of hazard because a spark would ignite the material both alone and in the powder mix, but also because these electrical charges caused the sulfur to form into aggregates or balls with the result that uniform ultimate mixtures were difficult to obtain. In the present instance, since the sulfur is largely in combination, it being a fact that even when sulfocarbons are employed that the major part of the sulfur used is in combination, there is little or no danger during the grinding operation either from balling or from igniting the material.

The sulfohydrocarbon or sulfocarbon can be ground by ordinary methods and will not catch fire spontaneously, which incidentally often occurs with freshly prepared wood charcoal. Wood charcoal absorbs oxygen strongly and must be carefully cooled and air admitted to it slowly to prevent its spontaneously catching fire. The oxygen is in the form of a film over the surface of the charcoal, and is in highly reactive form. This is a source of possible hazard both during manufacture and after the powder is made. Also the "activity" or absorptive properties of the charcoal differs widely depending on the wood used, conditions of carbonizing, etc. The variation between chars in the aborption of oxygen may account for the non-uniformity of results obtained in powder making.

The carbonaceous compounds used in the present invention do not absorb oxygen to any appreciable extent and thus are not subject to objections as to hazard or non-uniformity of product referred to in connection with charcoal.

In practice the hazards and difficulties of incorporating elemental sulfur with the sulfocarbon or sulfohydrocarbon is simplified because the two can be ground together in an edge runner to the desired degree of intimacy prior to mixing them with the potassium nitrate.

Ignition by accidental means is rendered less likely due to the fact that the sulfur is largely in chemical combination. The final incorporation of the ingredients and the danger attendant thereto are reduced substantially.

Another advantage of this mixture is that it is what may be termed a safety powder, and can be used in mines, etc., where ordinary blasting powder cannot be used.

The material can be ignited by the use of fuses, etc., in the ordinary manner. The utility of the material, especially as a blasting powder, is in no way effected by the reduction in danger which is attendant to ordinary gunpowder. The powders of this invention are less hygroscopic than ordinary blasting powder, hence usually do not require waterproofing. The mixtures are not dusty, hence the problem of dusting is reduced. The mixtures can be glazed and finished by ordinary methods, and can be formed into uniform granules.

The powder produced is uniform as to quality, and readily reproducible. It is unnecessary to blend several batches together, as is often done with ordinary powder, to insure a uniform material.

Other compounds or materials used in connection with powders of this type discussed may be incorporated in compositions of this invention. These include small percentages of nitrated aromatic compounds, such as trinitrotoluene, nitro benzenes, nitro naphthalenes, etc. Small proportions of water may be added, generally being below about 2%.

I claim as my invention:

An explosive comprising essentially a solid inorganic oxidizing agent intimately admixed with 25-40% by weight of a composition formed by mixing a heavy hydrocarbonaceous material selected from the class consisting of pitch, asphalt and petroleum residuum, with elemental sulfur in an amount equivalent to at least 60% of the hydrogen in said material, heating the mixture through the range of about 300-625° F. to produce a hard, infusible, insoluble, amorphous, black solid, known as a sulfohydrocarbon, calcining said sulfohydrocarbon at a temperature of about 1100° F. to about 1800° F. in a substantially oxygen free atmosphere, the resulting product having a density of about 1.5 to about 1.9, and having carbon, sulfur and hydrogen in stable chemical combination.

MARTIN DE SIMO.

REFERENCES CITED

The following references are of record in the file of this patent:

UNITED STATES PATENTS

| Number | Name | Date |
|---|---|---|
| 320,583 | Penniman | June 23, 1885 |
| 647,606 | Penniman | Apr. 17, 1900 |
| 751,751 | Pike | Feb. 9, 1904 |
| 1,872,941 | Hammond | Aug. 23, 1932 |
| 2,079,558 | Lindsley | May 4, 1937 |

FOREIGN PATENTS

| Number | Country | Date |
|---|---|---|
| 297,365 | Great Britain | Sept. 17, 1928 |
| 309,625 | Great Britain | Apr. 15, 1929 |